(12) United States Patent
Zhang et al.

(10) Patent No.: US 6,875,804 B2
(45) Date of Patent: Apr. 5, 2005

(54) SYNDIOTACTIC POLYSTYRENE COMPOSITIONS HAVING IMPROVED IMPACT STRENGTH

(75) Inventors: Xuequan Zhang, Taegeon (KR); Jae Gon Lim, Taegeon (KR)

(73) Assignee: Samsung Atofina Co., Inc. (KR)

( * ) Notice: Subject to any disclaimer, the term of this patent is extended or adjusted under 35 U.S.C. 154(b) by 119 days.

(21) Appl. No.: 10/450,080

(22) PCT Filed: Dec. 18, 2000

(86) PCT No.: PCT/KR00/01484

§ 371 (c)(1),
(2), (4) Date: Jun. 25, 2003

(87) PCT Pub. No.: WO02/50182

PCT Pub. Date: Jun. 27, 2002

(65) Prior Publication Data

US 2004/0030014 A1 Feb. 12, 2004

(51) Int. Cl.$^7$ .............................. C08J 3/00; C08K 5/17; C08K 5/33; C08L 51/00; C08L 53/00
(52) U.S. Cl. ...................... 524/236; 524/494; 524/502; 524/504; 524/505; 524/515; 524/517; 524/525; 524/577; 525/88; 525/93; 525/95; 525/98; 525/132; 525/185; 525/191; 525/207; 525/240; 525/241; 525/285; 525/316; 525/326.1; 525/327.4; 525/331.7; 525/333.3
(58) Field of Search ................................. 524/494, 502, 524/504, 505, 515, 517, 236, 525, 577; 525/88, 93, 95, 98, 132, 185, 191, 207, 240, 241, 285, 316, 326.1, 331.7, 327.4, 333.3

(56) References Cited

U.S. PATENT DOCUMENTS

| | | | |
|---|---|---|---|
| 5,270,353 A | 12/1993 | Nakano et al. | 523/214 |
| 5,352,727 A | 10/1994 | Okada | 524/495 |
| 5,391,603 A | 2/1995 | Wessel et al. | 524/396 |
| 5,543,462 A | 8/1996 | Okada et al. | 525/74 |
| 5,654,365 A | 8/1997 | Havriliak, Jr. et al. | 525/98 |
| 5,760,105 A | 6/1998 | Okada et al. | 523/201 |
| 5,777,028 A | 7/1998 | Okada et al. | 525/86 |

FOREIGN PATENT DOCUMENTS

| | | |
|---|---|---|
| JP | 5209098 | 8/1993 |
| JP | 7062175 | 3/1995 |
| JP | 8165422 | 6/1996 |
| JP | 10025382 | 1/1998 |
| JP | 2000191868 | 7/2000 |
| KR | 1999-0068131 | 8/1999 |

*Primary Examiner*—Patrick D. Niland
(74) *Attorney, Agent, or Firm*—Woodcock Washburn LLP

(57) ABSTRACT

The syndiotactic polystirene resin composition according to the present invention is superior in compatibility between a syndiotactic polystyrene and a rubber component and mechanical properties such as impact strength, in which a syndiotactic polystyrene-maleic anhydride (sPS-MA) and a hydrogenated styrene/butadiene/styrene-maleic anhydride (SEBS-MA) are employed as compatibilizers and a diamine compound is added as a coupling agent. The compatibilizers and coupling agents improve polarity of both the syndiotactic polystyrene and the rubber component and impact strength of the syndiotactic polystyrene composition.

8 Claims, 1 Drawing Sheet

SYNDIOTACTIC POLYSTYRENE COMPOSITIONS HAVING IMPROVED IMPACT STRENGTH

FIELD OF THE INVENTION

The present invention relates to a syndiotactic polystyrene resin composition having good impact strength. More particularly, the present invention relates to a syndiotactic polystyrene resin composition in which a syndiotactic polystyrene-maleic anhydride (sPS-MA) and a hydrogenated styrene/butadiene/styrene-maleic anhydride (SEBS-MA) are employed as compatibilizers and a diamine compound is added, resulting to provide good impact strength as well as good mechanical properties.

BACKGROUND OF THE INVENTION

Syndiotactic polystyrene is a very attractive polymer. The polymer shows low specific gravity, low dielectric constant, high flexural modulus, good heat resistance, good rigidity, high melting point ($T_m$) of about 270° C. and excellent resistance to chemicals. Accordingly the syndiotactic polystyrene has become a promising material for various applications in the automotive, electronic and packaging industries. However, the applications of the syndiotactic polystyrene resin composition are highly limited because impact strength is too low. To overcome such shortcoming, an impact reinforcing material such as rubber and various compatibilizers for the syndiotactic polystyrene and the impact reinforcing material have been used in the syndiotactic polystyrene resin composition.

U.S. Pat. No. 5,270,353 to Nakano et al. discloses a styrene-based resin composition comprising a styrene-based polymer having a syndiotactic configuration and no functional group, a styrene-based polymer having an epoxy group and an inorganic filler surface treated by a silane compound or a titanium compound.

U.S. Pat. No. 5,352,727 to Okada discloses a polystyrene composition comprising syndiotactic polystyrene and a syndiotactic polystyrene impact modifier, said syndiotactic polystyrene impact modifier being the reaction product of a syndiotactic polystyrene having a first reactive functional group, and a rubbery elastomer containing a second reactive functional group, said first and second reactive functional groups being reactive with each other.

U.S. Pat. No. 5,391,603 to Wessel et al. discloses a composition comprising a syndiotactic, vinylaromatic thermopalstic resin, a rubbery, impact absorbing domain forming polymer, a nucleator for the syndiotactic, vinylaromatic thermoplastic resin, an mineral, glass, ceramic, polymeric or carbon reinforcing agent, and one or more polyarylene ethers or polar group modified polyarylene ethers.

U.S. Pat. No. 5,543,462 to Okada et al. discloses an impact resistant polystyrene composition comprising a styrenic polymer having syndiotactic configuration and a rubbery elastomer modified by a modifier having a polar group, and optionally a rubbery elastomer and/or a poly(phenylene ether).

U.S. Pat. No. 5,654,365 to Havriliak, Jr. et al. discloses a syndiotactic polystyrene composition impact-modified by a blend of polystyrene-hydrogenated polybutadiene block copolymers and one or more core/shell modifiers based on a lightly or non-crosslinked rubber core.

U.S. Pat. No. 5,760,105 to Okada et al. discloses a styrenic resin composition comprising an styrenic polymer having syndiotactic configuration (sPS) or modified sPS, a thermoplastic resin having a polar group, a rubbery elastomer having affinity for the sPS and a compatibilizer having a polar group.

U.S. Pat. No. 5,777,028 to Okada et al. discloses an impact resistant polystyrene composition comprising a styrenic polymer having syndiotactic configuration, a rubbery elastomer having an olefinic component or a polyolefin and a styrene/olefin block or graft copolymer having a microphase separation temperature of 180° C.

There are two major conventional methods to prepare a syndiotactic polystyrene composition. One is to improve elasticity of the syndiotactic polystyrene composition by simply blending a syndiotactic polystyrene and a rubber component, and the other is to improve surface properties between a syndiotactic polystyrene and a rubber component by using another rubber component as a compatibilizer to prevent phase separation at the surface. The latter method is more preferable in processability and physical properties. However, the latter method focuses on improvement of polarity of both the syndiotactic polystyrene and the rubber component but does not contribute improvement of impact strength to the syndiotactic polystyrene composition.

Accordingly, the present inventors have developed a syndiotactic polystyrene resin composition with good impact strength as well as good mechanical properties, in which a syndiotactic polystyrene-maleic anhydride (sPS-MA) and a hydrogenated styrene/butadiene/styrene-maleic anhydride (SEBS-MA) are employed as compatibilizers and a diamine compound is added as a coupling agent. The compatibilizers and coupling agent improve polarity of both the syndiotactic polystyrene and the rubber component and impact strength of the syndiotactic polystyrene composition.

OBJECTS OF THE INVENTION

A feature of the present invention is the provision of a syndiotactic polystyrene resin composition with good impact strength as well as good mechanical properties.

Another feature of the present invention is the provision of a syndiotactic polystyrene resin composition with good compatibility between a syndiotactic polystyrene and a rubber component, in which a syndiotactic polystyrene-maleic anhydride (sPS-MA) and a hydrogenated styrene/butadiene/styrene-maleic anhydride (SEBS-MA) are employed as compatibilizers and a diamine is added as a coupling agent.

A further feature of the present invention is the provision of a syndiotactic polystyrene resin composition having good physical properties that are required for various applications thereof.

Other objects and advantages of this invention will be apparent from the ensuing disclosure and appended claims.

SUMMARY OF THE INVENTION

The syndiotactic polystyrene resin composition according to the present invention is superior in compatibility between a syndiotactic polystyrene and a rubber component and mechanical properties such as impact strength, in which a syndiotactic polystyrene-maleic anhydride (sPS-MA) and a hydrogenated styrene/butadiene/styrene-maleic anhydride (SEBS-MA) are employed as compatibilizers and a diamine compound is added as a coupling agent. The compatibilizers and coupling agents improve the polarity between the syndiotactic polystyrene of the main matrix part and SEBS of the rubber domain part, and the impact strength of the syndiotactic polystyrene composition.

DETAILED DESCRIPTION OF THE INVENTION

Figure 1:
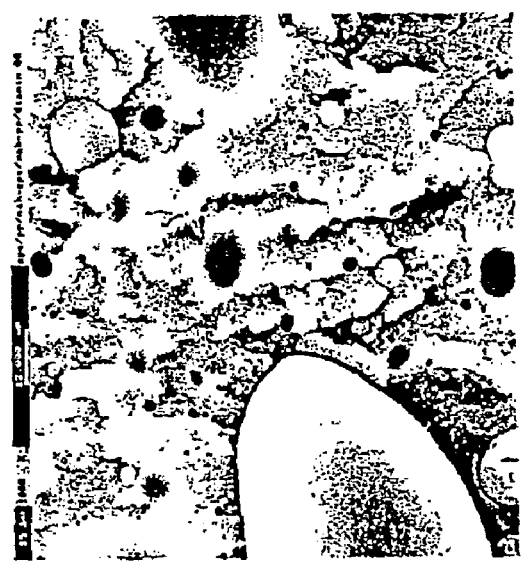
FIG. 1 is a scanning electron microscope (SEM) photograph of the surface of syndiotactic polystyrene/polypropylene.

The syndiotactic polystyrene resin composition according to the present invention has good compatibility between a syndiotactic polystyrene and a rubber component and good mechanical properties such as impact strength. The syndiotactic polystyrene composition employs a syndiotactic polystyrene-maleic anhydride (sPS-MA) and a hydrogenated styrene/butadiene/styrene-maleic anhydride (SEBS-MA) as compatibilizers and a diamine compound as a coupling agent. The compatibilizers and coupling agent may improve polarity of both the syndiotactic polystyrene and the rubber component and impact strength of the syndiotactic polystyrene composition.

The hydrogenated styrene/butadiene/styrene-maleic anhydride (SEBS-MA) and the syndiotactic polystyrene-maleic anhydride (sPS-MA) carry out a coupling reaction with a diamine compound to improve uniform mixing of the syndiotactic polystyrene and the rubber component. The coupling reaction between the hydrogenated styrene/butadiene/styrene-maleic anhydride (SEBS-MA) and the syndiotactic polystyrene-maleic anhydride (sPS-MA) is represented as follow:

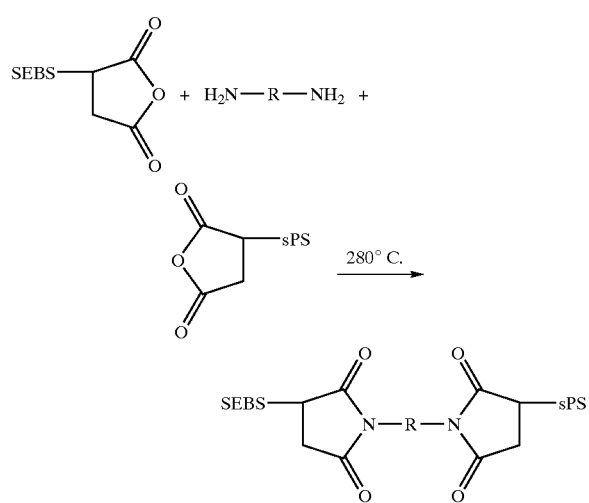

where R is 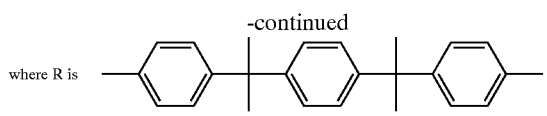

All the components composing of the syndiotactic polystyrene resin composition according to the present invention will be described in detail as follow:

(A) Syndiotactic Polystyrene (sPS)

In general, polystrenes are classified into an atactic, an isotactic and a syndiotactic structure depending on the position of benzene rings as side chains. An atactic polystyrene has an irregular arrangement of the benzene rings and an isotactic polystyrene has an arrangement that the benzene rings are positioned at one side of the polymer main chain. On the other hand, a syndiotactic polystyrene has a regularly alternating arrangement of the benzene rings.

The syndiotactic polystyrenes are prepared with styrene monomers under the catalyst system of a metallocene catalyst and a cocatalyst. The metallocene catalyst has a bridged structure of a complex of Group IV transition metals such as Ti, Zr, Hf etc. in the Periodic Table and a ligand having one or two cycloalkane dienyl groups such as cyclopentadienyl group, indenyl group, fluorenyl group, and derivatives thereof. As metallocene catalysts have high activities, the catalysts can prepare polymers having better physical properties than the Ziegler-Natta catalysts. U.S. patent Ser. Nos. 08/844,109 and 08/844,110 disclose new alkyl-bridged binuclear metallocene catalysts, silyl-bridged binuclear metallocene catalysts, and alkyl-silyl-bridged binuclear metallocene catalysts to polymerize styrenes to produce polystyrene having high stereoregularity, high melting point, and good molecular weight distribution.

U.S. patent Ser. No. 09/231,884 filed Jan. 14, 1999 discloses a new syndiotactic polystyrene prepared under the catalyst system a metallocene catalyst and a cocatalyst.

It is preferable to use a syndiotactic polystyrene with a syndiotacticity of 97% or more in this invention.

The syndiotactic polystyrene is used in the amount of about 50~95 parts by weight per 100 parts of the resin composition.

(B) Rubber Component

A rubber component is added to the syndiotactic polystyrene resin composition according to the present invention. A hydrogenated styrene/butadiene/styrene block copolymer (SEBS) is preferably used as a rubber component. Polypropylene rubber (PP), ethylene/propylene/diene rubber (EPDM) or ethyl vinyl acetate (EVA) may be substituted for the SEBS. The rubber component absorbs impact and improves impact strength of the resin composition.

The runner component is used in the amount of about 1~95 parts by weight per 100 parts of the resin composition.

(C) First Compatibilizer

When SEBS is used as a rubber component in the syndiotactic polystyrene resin composition according to the present invention, a hydrogenated styrene/butadiene/styrene-maleic anhydride (SEBS-MA) is used as a first compatibilizer to improve compatibility between the syndiotactic polystyrene and the rubber component.

The hydrogenated styrene/butadiene/styrene-maleic anhydride (SEBS-MA) is prepared by treating hydrogenated styrene/butadiene/styrene with maleic anhydride, which can be carried out by an ordinary skilled person in the alt. Also, the hydrogenated styrene/butadiene/styrene-maleic anhydride (SEBS-MA) is commercially available.

When PP is used as a rubber component in the syndiotactic polystyrene resin composition according to the present invention, a polypropylene-graft-maleic anhydride (PP-g-MA) is used as a first compatibilizer to improve compatibility between the syndiotactic polystyrene and the rubber component.

The polypropylene-graft-maleic anhydride (PP-g-MA) is prepared by treating polypropylene with maleic anhydride, which can be carried out by an ordinary skilled person in the art. Also, the polypropylene-graft-maleic anhydride (PP-g-MA) is commercially available.

When EPDM is used as a rubber component in the syndiotactic polystyrene resin composition according to the present invention, an ethylene/propylene/diene-graft-maleic anhydride (EPDM-g-MA) or an ethylene/propylene/diene-graft-polystyrene (EPDM-g-PS) is used as a first compatibilizer to improve compatibility between the syndiotactic polystyrene and the rubber component.

The ethylene/propylene/diene-graft-maleic anhydride (EPDM-g-MA) is prepared by grafting maleic anhydride onto ethylene/propylene/diene, which can be carried out by an ordinary skilled person in the art. Also, the EPDM-g-MA is commercially available. The ethylene/propylene/diene-graft-polystyrene (EPDM-g-PS) is prepared by polystyrene onto ethylene/propylene/diene, which can be carried out by an ordinary skilled person in the art Also, the EPDM-g-PS is commercially available.

When EVA is used as a rubber component in the syndiotactic polystyrene resin composition according to the present invention, diamine may not be used.

The first compatibilizer is used in the amount of about 0~20 parts by weight per 100 parts of the resin composition.
(D) Second Compatibilizer A syndiotactic polystyrene-maleic anhydride (sPS-MA) is used in the syndiotactic polystyrene resin composition according to the present invention as a second compatibilizer to improve compatibility between the syndiotactic is polystyrene and the rubber component.

The syndiotactic polystyrene-maleic anhydride (sPS-MA) is prepared by treating syndiotactic polystyrene with maleic anhydride, which can be carried out by a special method. So, the syndiotactic polystyrene-maleic anhydride (sPS-MA) is not commercially available.

The second compatibilizer is used in the amount of about 0~10 parts by weight per 100 parts of the resin composition.
(E) Polyphenyleneoxide (PPO)

PPO is added to the syndiotactic polystyrene resin composition according to the present invention to improve compatibility between the syndiotactic polystyrene and the rubber component. PPO is commercially available.

Polyphenyleneoxide (PPO) is used in the amount of about 0~10 parts by weight per 100 parts of the resin composition.
(F) Coupling Agent In the present invention, the hydrogenated styrene/butadiene/styrene-maleic anhydride (SEBS-MA) and the syndiotactic polystyrene-maleic anhydride (sPS-MA) carry out a coupling reaction with a coupling agent to improve uniform mixing of the syndiotactic polystyrene and the rubber component. The coupling agent is preferably a diamine compound.

The most preferable diamine is represented as follow:

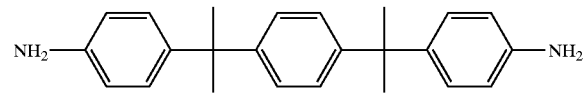

Diamine compound is used in the amount of about 0.02~20 parts by weight per 100 parts of the resin composition.

The syndiotactic polystyrene resin composition according to the present invention may optionally include a reinforcing material.
(G) Glass Fibers A reinforcing material may be added to the syndiotactic polystyrene resin composition according to the present invention. Glass fibers may be preferably used as a reinforcing material in this invention.

Glass fibers are used in the amount of about 5~40 parts by weight per 100 parts of the resin composition.
(H) Other Additives Other additives may be added to the resin composition of the present invention, if necessary. The additives include an additional flame retardant, a lubricant, a releasing agent, an anti-dripping agent, an impact modifier, a plasticizer, a heat stabilizer, an anti-oxidant, a light stabilizer, pigments, dye and the like. An inorganic filler such as talc, silica, mica or ceramic can be added too. The additives are employed in an amount of about 0 to 40 parts by weight as per 100 parts of the resin composition.

A first syndiotactic polystyrene resin composition according to the present invention comprises about 50~95 parts by weight of syndiotactic polystyrene (sPS), about 2~20 parts by weight of hydrogenated styrene/butadiene/styrene block copolymer (SEBS), about 1~10 parts by weight of hydrogenated styrene/butadiene/styrene-maleic anhydride (SEBS-MA), about 1~10 parts by weight of syndiotactic polystyrene-maleic anhydride (sPS-MA), about 1~10 parts by weight of polyphenyleneoxide (PPO), about 0.02~20 parts by weight of diamine, and optionally about 5~30 parts by weight of glass fibers.

A second syndiotactic polystyrene resin composition comprises about 50~96 parts by weight of syndiotactic polystyrene (sPS), about 1~20 parts by weight of polypropylene rubber (PP), about 1~10 parts by weight of polypropylene-graft-maleic anhydride (PP-g-MA), about 1~10 parts by weight of syndiotactic polystyrene-maleic anhydride (sPS-MA), about 1~10 parts by weight of polyphenyleneoxide (PPO), and about 0.02~30 parts by weight of diamine.

A third syndiotactic polystyrene resin composition comprises about 50~96 parts by weight of syndiotactic polystyrene (sPS), about 1~20 parts by weight of ethylene/propylene/diene rubber (EPDM), about 1~10 parts by weight of ethylene/propylene/diene-graft-maleic anhydride (EPDM-g-A) or ethylene/propylene/diene-graft-polystyrene (EPDM-g-PS), about 1~10 parts by weight of syndiotactic polystyrene-maleic anhydride (sPS-MA), about 1~10 parts by weight of polyphenyleneoxide (PPO), and about 0.02~30 parts by weight of a diamine.

A fourth syndiotactic polystyrene resin composition according to the present invention comprises about 2~90 parts by weight of syndiotactic polystyrene (sPS), about 0~10 parts by weight of hydrogenated styrene/butadiene/styrene block copolymer (SEBS), about 2~10 parts by weight of hydrogenated styrene/butadiene/styrene-maleic anhydride (SEBS-MA), about 0~10 parts by weight of syndiotactic polystyrene-maleic anhydride (sPS-MA), about 2~10 parts by weight of polyphenyleneoxide (PPO), about 0.02~20 parts by weight of diamine, and about 6~90 parts by weight of ethyl vinyl acetate copolymer (EVA).

A fifth syndiotactic polystyrene resin composition according to the present invention comprises about 2~93 parts by weight of syndiotactic polystyrene (sPS), about 0~10 parts by weight of hydrogenated styrene/butadiene/styrene block copolymer (SEBS), about 1~10 parts by weight of syndiotactic polystyrene-maleic anhydride (sPS-MA), about 1~10 parts by weight of polyphenyleneoxide (PPO), about 5~90 parts by weight of ethyl vinyl acetate copolymer (EVA), and about 1~50 parts by weight of glass fibers.

The invention may be better understood by reference to the following examples which are intended for the purpose of illustration and are not to be constrained as in any way limiting the scope of the present invention, which is defined in the claims appended hereto. In the following examples, all parts and percentage are by weight unless otherwise indicated.

EXAMPLES

The syndiotactic polystyrene resin compositions according to the present invention are prepared from (A) a syndiotactic polystyrene (sPS), (B) a rubber component of SEBS, PP, EPDM and EVA, (C) a first compatibilizer of hydrogenated styrene/butadiene/styrene-maleic anhydride (SEBS-MA), polypropylene-graft-maleic anhydride (PP-g-MA), ethylene/propylene/diene graft-maleic anhydride (EPDM-g-MA) and ethylene/propylene/diene-graft-polystyrene (EPDM-g-PS), (D) a second compatibilizer of syndiotactic polystyrene-maleic anhydride (sPS-MA), (E) polyphenyleneoxide (PPO), (F) a coupling agent of a diamine compound, (G) glass fibers and (H) other additives.

The components to prepare the syndiotactic polystyrene resin compositions according to the present invention of Examples and Comparative Examples are as follows:

(A) Syndiotactic Polystyrene (sPS)

Syndiotactic polystyrene with syndiotacticity of 97% was prepared in a glass reactor. Styrene monomers were polymerized in a glass reactor equipped with a temperature controller, a magnetic agitator or a mechanical agitator, and valves through which the monomers and nitrogen were fed. To the glass reactor was methyl aluminoxane as a cocatalyst added and the reactor was agitated for 30 minutes. Sufficient amount of catalyst was added to the reactor. Polymerization was initiated at 70° C. After reaction for one hour, the polymerization was terminated by adding methanol. The resulting solution was washed with methanol in excess and sodium hydroxide and filtered. The resulting polymer was dried at 90° C. in vacuum for about 4 hours to obtain syndiotactic polystyrene.

(B) Rubber Component ($B_1$) Hydrogenated Styrene/Butadiene/Styrene Block Copolymer (SEBS): A commercial product (Kraton G-1651) of Shell Co. was used as SEBS.

($B_2$) Polypropylene Rubber (PP): A commercial product (HJ-400) of Samsung General Chemical Co. was used as PP.

($B_3$) Ethylene/Propylene/Diene Rubber (EPDM): A commercial product (KEP-570P) of Keumho Co. of Korea was used as EPDM.

($B_4$) Ethyl vinyl acetate Copolymer (EVA): A commercial product (E220F: 22% by weight of vinyl acetate) of Samsung General Chemical Co. of Korea was used as EVA copolymer.

(C) First Compatibilizer ($C_1$) Hydrogenated Styrene/Butadiene/Styrene-Maleic anhydride (SEBS-MA): A commercial product (M-1913) of Asahi Co. of Japan was used as SEBS-MA.

($C_2$) Polypropylene-graft-Maleic anhydride (PP-g-MA): The PP-g-MA was synthesized by grafting maleic anhydride onto polypropylene.

($C_3$) Ethylene/Propylene/Diene-graft-Polystyrene (EPDM-g-PS): The EPDM-g-PS was synthesized by reacting EPDM and styrene monomers.

($C_4$) Ethylene/Propylene/Diene-graft-Maleic anhydride (EPDM-g-MA): A commercial product (Excellor) of Uniroyal Co. was used as EPDM-g-MA.

(D) Second Compatibilizer

The syndiotactic polystyrene prepared above was reacted with dicumylperoxide and maleic anhydride in a 10 L reactor to produce syndiotactic polystyrene-maleic anhydride (sPS-MA) as a second compatibilizer.

(E) Polyphenyleneoxide (PPO)

A commercial product (P401) of Asahi Co. of Japan was used as PPO.

(F) Coupling Agent

The diamine represented below was used:

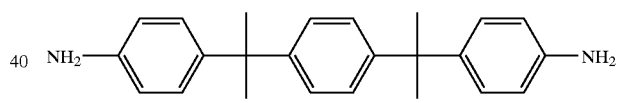

(G) Glass Fibers

A commercial product (492A) of Owin-Corning Co. of U.S.A. was used as glass fibers.

(H) Other Additives

Appropriate amounts of antioxidants were used in the resin compositions of the Examples and Comparative Examples.

Example 1 and Comparative Examples 1–4

The components of Example 1 and Comparative Examples 1–4 are shown in Table 1.

The resin compositions of Example 1 and Comparative Examples 14 were prepared in a batch type mixer of Haake Co. of Germany by mixing at 50 rpm and 280° C. for seven minutes. Specimens of ⅛" were prepared at 300° C. in a mold according to ASTM D256 and Izod impact strength were measured therefore in accordance with ASTM D638. The Izod impact strengths are shown in Table 1. The resin composition of Example 1 using sPS-MA and diamine shows better Izod impact strength than the resin compositions of Comparative Examples 1–4.

TABLE 1

|  | Example | Comparative Examples | | | |
|---|---|---|---|---|---|
|  | 1 | 1 | 2 | 3 | 4 |
| (A) sPS | 72 | 72 | 76 | 72 | 76 |
| (B) ($B_1$) SEBS | 16 | 16 | 16 | 16 | 12 |
| (C) ($C_1$) SEBS-MA | 4 | 4 | 4 | 4 | 8 |
| (D) sPS-MA | 4 | 4 | 0 | 0 | 0 |
| (E) PPO | 4 | 4 | 4 | 8 | 4 |
| (F) Diamine | 2 | 0 | 0 | 0 | 0 |
| Izod Impact Strength (kgf.cm/cm) | 29.8 | 28.7 | 27.7 | 24.2 | 17.2 |

For measuring physical properties of the resin compositions of Example 1 and Comparative Example 2, the resin compositions were prepared in pellets in a twin screw extruder at 280° C. The pellets were dried at 80° C. for 3 hours and molded into specimens in a 50 ton injection molding machine at 300° C. The Comparative Example 2 was to prepare a resin composition according to U.S. Pat. No. 5,777,028. The physical properties such as yield strength, breaking strength, elongation, flexural rigidity and flexural strength. The physical properties are shown in Table 2.

TABLE 2

|  | Example 1 | Comparative Example 2 |
|---|---|---|
| yield strength (kgf/cm$^2$) | 439 | 434 |
| breaking strength (kgf/cm$^2$) | 427 | 384 |
| elongation (%) | 4 | 4 |
| flexural rigidity (kgf/cm$^2$) | 711 | 705 |
| flexural strength (kgf/cm$^2$) | 24,410 | 24,040 |

Notes: The yield strength and breaking strength were measured in acordance with ASTM D638 and the elongation, flexural rigidity and flexural strength were measured in accordance with ASTM D790.

As shown in Table 2, the resin composition of Example 1 using sPS-MA and diamine shows better yield strength, breaking strength, flexural rigidity and flexural strength than the resin composition of Comparative Example 2.

Examples 2–8

The components of Examples 2–8 are shown in Table 3. Examples 2–8 were conducted in the same manner as in Example 1 except the components of Table 3. The Izod impact strengths are shown in Table 3.

TABLE 3

|  | Examples | | | | | | |
|---|---|---|---|---|---|---|---|
|  | 2 | 3 | 4 | 5 | 6 | 7 | 8 |
| (A) sPS | 57 | 67 | 63 | 65 | 56 | 58 | 57 |
| (B) ($B_1$) SEBS | 12 | 12 | 12 | 12 | 3 | 4 | 3 |
| (C) ($C_1$) SEBS-MA | 3 | 3 | 3 | 3 | 0 | 0 | 0 |
| ($C_3$) (EPDM-g-PS) | 0 | 0 | 0 | 0 | 12 | 19 | 12 |
| (D) sPS-MA | 12 | 3 | 6 | 4 | 3 | 3 | 3 |
| (E) PPO | 3 | 3 | 3 | 3 | 3 | 3 | 3 |
| (F) Diamine | 1 | 0 | 1 | 1 | 1 | 1 | 0 |
| (G) Glass Fibers | 15 | 15 | 15 | 15 | 25 | 15 | 25 |
| Izod Impact Strength (kgf.cm/cm) | 3.5 | 3.8 | 4.2 | 10.7 | 2.8 | 3.3 | 2.6 |

As shown in Table 3, the more EPDM-g-PS is used as a compatibilizer, the better impact strength is obtained. When SEBS-MA is used as a compatibilizer, if diamine and a small amount of sPS-MA is used, the resin composition (of Example 5) shows a highest impact strength.

Examples 9–17 and Comparative Example 5

The components of Examples 9–17 and Comparative Example 5 are shown in Table 4. Examples 9–17 and Comparative Example 5 were conducted in the same manner as in Example 1 except the components of Table 4. The Izod impact strengths are shown in Table 4.

TABLE 4

|  | Examples | | | | | | | | | Comp. Ex. |
|---|---|---|---|---|---|---|---|---|---|---|
|  | 9 | 10 | 11 | 12 | 13 | 14 | 15 | 16 | 17 | 5 |
| (A) sPS | 76 | 76 | 76 | 72 | 72 | 72 | 64 | 64 | 64 | 80 |
| (B) ($B_2$) PP | 19 | 19 | 19 | 18 | 18 | 18 | 16 | 16 | 16 | 20 |
| (C) ($C_2$) PP-g-MA | 1 | 1 | 1 | 2 | 2 | 2 | 4 | 4 | 4 | 0 |
| (D) sPS-MA | 4 | 4 | 4 | 8 | 8 | 8 | 16 | 16 | 16 | 0 |
| (F) Diamine | 1 | 2 | 4 | 1 | 2 | 4 | 1 | 2 | 4 | 0 |
| Izod Impact Strength (kgf.cm/cm) | 2.88 | 2.03 | 3.54 | 2.88 | 3.16 | 3.73 | 2.78 | 3.35 | 4.58 | 2.22 |

Figure 2:
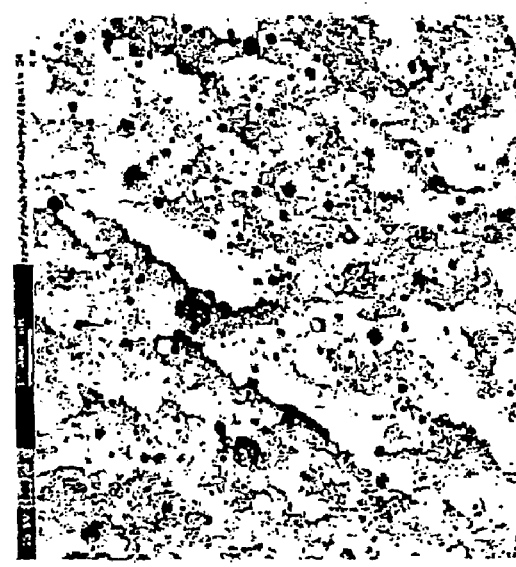
FIG. 2 is a scanning electron microscope (SEM) photograph of the surface of sPS/sPS-MA/PP/PP-MA/diamine.

As shown in Table 4, the more diamine and PP-g-MA are used, the better impact strength is obtained. FIG. 1 is a scanning electron microscope (SEM) photograph of the surface of syndiotactic polystyrene/polypropylene of Comparative Example 5, and FIG. 2 is a scanning electron microscope (SEM) photograph of the surface of sPS/sPS-MA/PP/PP-MA//diamine(76/4/16/4/2). As shown in FIG. 1, the surface is not uniform and the Izod impact strength is poor.

Examples 18–19 and Comparative Examples 6–12

The components of Examples 18–19 and Comparative Examples 6–12 are shown in Table 5. Examples 18–19 and Comparative Examples 6–12 were conducted in the same manner as in Example 1 except the components of Table 5. The Izod impact strengths are shown in Table 5.

TABLE 5

|  | Examples | | Comparative Examples | | | | | | |
| --- | --- | --- | --- | --- | --- | --- | --- | --- | --- |
|  | 18 | 19 | 6 | 7 | 8 | 9 | 10 | 11 | 12 |
| (A) sPS | 72 | 72 | 72 | 80 | 80 | 76 | 76 | 76 | 76 |
| (B) ($B_1$) SEBS | 4 | 0 | 4 | 0 | 0 | 4 | 4 | 0 | 0 |
| ($B_3$) EPDM | 0 | 0 | 16 | 20 | 0 | 16 | 0 | 20 | 0 |
| (C) ($C_4$) EPDM-g-MA | 16 | 20 | 0 | 0 | 20 | 0 | 16 | 0 | 20 |
| (D) sPS-MA | 4 | 4 | 4 | 0 | 0 | 0 | 0 | 0 | 0 |
| (E) PPO | 4 | 4 | 4 | 0 | 0 | 4 | 4 | 4 | 4 |
| (F) Diamine | 1 | 1 | 1 | 0 | 0 | 0 | 0 | 0 | 0 |
| Izod Impact Strength (kgf.cm/cm) | 8.25 | 8.93 | 2.78 | 2.88 | 2.97 | 6.21 | 2.60 | 5.44 | 3.25 |

As shown in Examples 18–19 of Table 5, when diamine is used and the more EPDM-g-MA is used, the better impact strength is obtained. The resin compositions of Comparative Examples 6–12 in which diamine is not used show poor Izod impact strength.

Examples 20–27

The components of Examples 20–27 are shown in Table 6. Examples 20–27 were conducted in the same manner as in Example 1 except the components of Table 6. The Izod impact strengths are shown in Table 6.

TABLE 6

|  | Examples | | | | | | | |
| --- | --- | --- | --- | --- | --- | --- | --- | --- |
|  | 20 | 21 | 22 | 23 | 24 | 25 | 26 | 27 |
| (A) sPS | 82 | 72 | 62 | 42 | 32 | 22 | 12 | 2 |
| (B) ($B_4$) EVA | 6 | 16 | 26 | 46 | 56 | 66 | 76 | 86 |
| (C) ($C_1$) SEBS-MA | 4 | 4 | 4 | 4 | 4 | 4 | 4 | 4 |
| (D) sPS-MA | 4 | 4 | 4 | 4 | 4 | 4 | 4 | 4 |
| (E) PPO | 4 | 4 | 4 | 4 | 4 | 4 | 4 | 4 |
| (F) Diamine | 1 | 1 | 1 | 1 | 1 | 1 | 1 | 1 |
| Izod Impact Strength (kgf.cm/cm) | 6.75 | 4.33 | 3.33 | 9.66 | 10.65 | 16.95 non-brake | — non-brake | 10.91 non-brake |

As shown in Table 6, Examples 20–27 were conducted to obtain optimum amounts of sPS and EVA. For good Izod impact strength of the resin composition, sPS may preferably be used in about 35~40 parts by weight and EVA may preferably be used in about 55~60 parts by weight.

Examples 28–35

The components of Examples 28–35 are shown in Table 7. Examples 28–35 were conducted in the same manner as in Example 1 except the components of Table 7. The Izod impact strengths are shown in Table 7.

TABLE 7

|  | Examples | | | | | | | |
|---|---|---|---|---|---|---|---|---|
|  | 28 | 29 | 30 | 31 | 32 | 33 | 34 | 35 |
| (A) sPS | 32 | 33 | 36 | 32 | 36 | 36 | 40 | 0 |
| (B) (B$_1$) SEBS | 4 | 4 | 4 | 4 | 0 | 0 | 0 | 0 |
| (B$_4$) EVA | 56 | 55 | 56 | 60 | 56 | 60 | 60 | 100 |
| (D) sPS-MA | 4 | 4 | 0 | 4 | 4 | 4 | 0 | 0 |
| (E) PPO | 4 | 4 | 4 | 0 | 4 | 0 | 0 | 0 |
| (G) Glass Fibers | 15 | 30 | 30 | 30 | 30 | 30 | 30 | 30 |
| Izod Impact Strength (kgf.cm/cm) | 24.3 non-brake | 29.1 | 29.1 | 28.0 | 25.6 | 26.7 | 26.7 | 19.8 non-brake |

As shown in Table 7, the resin composition (Example 35) consisting of EVA and GF shows a poor impact strength compared to other resin compositions. Eva is rubber component for absorbing impact and can be used more economically than SEBS.

The present invention can be easily carried out by an ordinary skilled person in the art. Many modifications and changes may be deemed to be with the scope of the present invention as defined in the following claims.

What is claimed is:

1. A syndiotactic polystyrene resin composition comprising (a) about 50~95 parts by weight of syndiotactic polystyrene (sPS), (b) about 2~20 parts by weight of hydrogenated styrene/butadiene/styrene block copolymer (SEBS), (c) about 1~10 parts by weight of hydrogenated styrene/butadiene/styrene-maleic anhydride (SEBS-MA), (d) about 1~10 parts by weight of syndiotactic polystyrene-maleic anhydride (sPS-MA), (e) about 1~10 parts by weight of polyphenyleneoxide (PPO), and (f) about 0.02~20 parts by weight of diamine.

2. The syndiotactic polystyrene resin composition as defined in claim 1, further comprising (g) about 5~30 parts by weight of glass fibers.

3. A syndiotactic polystyrene resin composition comprising (a) about 50~96 parts by weight of syndiotactic polystyrene (sPS), (b) about 1~20 parts by weight of polypropylene rubber (PP), (c) about 1~10 parts by weight of polypropylene-graft-maleic anhydride (PP-g-MA), (d) about 1~10 parts by weight of syndiotactic polystyrene-maleic anhydride (sPS-MA), (e) about 1~10 parts by weight of polyphenylencoxide (PPO), and (f) about 0.02~30 parts by weight of diamine.

4. A syndiotactic polystyrene resin composition comprising (a) about 50~96 parts by weight of syndiotactic polystyrene (sPS), (b) about 1~20 parts by weight of ethylene/propylene/diene rubber (EPDM), (c) about 1~10 parts by weight of ethylene/propylene/diene-graft-maleic anhydride (EPDM-g-MA) or ethylene/propylene/diene-graft-polystyrene (EPDM-g-PS), (d) about 1~10 parts by weight of syndiotactic polystyrene-maleic anhydride (sPS-MA), (e) about 1~10 parts by weight of polyphenyleneoxide (PPO), and (t) about 0.02~30 parts by weight of a diamine.

5. The syndiotactic polystyrene resin composition as defined in any one of claims 1–4, further comprising an additional flame retardant, a lubricant, a releasing agent, an anti-dripping agent, an impact modifier, a plasticizer, a heat stabilizer, an anti-oxidant, a light stabilizer, pigments, dye and/or an inorganic filler.

6. A syndiotactic polystyrene resin composition comprising (a) about 2~93 parts by weight of syndiotactic polystyrene (sPS), (b) about 0~10 parts by weight of hydrogenated styrene/butadiene/styrene block copolymer (SEBS), (c) about 1~10 parts by weight of syndiotactic polystyrene-maleic anhydride (sPS-MA), (d) about 1~10 parts by weight of polyphenyleneoxide (PPO), (e) about 5~90 parts by weight of ethyl vinyl acetate copolymer (EVA), and (f) about 1~50 parts by weight of glass fibers.

7. A syndiotactic polystyrene resin composition comprising (a) about 2~90 parts by weight of syndiotactic polystyrene (sPS), (b) about 0~10 parts by weight of hydrogenated styrene/butadiene/styrene block copolymer (SEBS), (c) about 2~10 parts by weight of hydrogenated styrene/butadiene/styrene-maleic anhydride (SEBS-MA), (d) about 0~10 parts by weight of syndiotactic polystyrene-maleic anhydride (sPS-MA), (e) about 2~10 parts by weight of polyphenyleneoxide (PPO), (f) about 0.02~20 parts by weight of diamine, and (g) about 6~90 parts by weight of ethyl vinyl acetate copolymer (EVA).

8. The syndiotactic polystyrene resin composition as defined in claim 6 or 7, further comprising an additional flame retardant, a lubricant, a releasing agent, an anti-dripping agent, an impact modifier, a plasticizer, a heat stabilizer, an anti-oxidant, a light stabilizer, pigments, dye and/or an inorganic filler.

* * * * *